US009365271B2

(12) United States Patent
Minnock et al.

(10) Patent No.: US 9,365,271 B2
(45) Date of Patent: Jun. 14, 2016

(54) FLUID INJECTION SYSTEM

(71) Applicant: Cameron International Corporation, Houston, TX (US)

(72) Inventors: Kevin Minnock, Longford (IE); Eddie McHugh, Co Longford (IE)

(73) Assignee: Cameron International Corporation, Houston, TX (US)

(*) Notice: Subject to any disclaimer, the term of this patent is extended or adjusted under 35 U.S.C. 154(b) by 322 days.

(21) Appl. No.: 14/023,413

(22) Filed: Sep. 10, 2013

(65) Prior Publication Data
US 2015/0068440 A1 Mar. 12, 2015

(51) Int. Cl.
*E21B 33/076* (2006.01)
*E21B 43/16* (2006.01)
*B63G 8/00* (2006.01)
*E21C 50/00* (2006.01)
*G01F 15/00* (2006.01)
*G01F 15/14* (2006.01)
*E21B 43/013* (2006.01)

(52) U.S. Cl.
CPC .............. *B63G 8/001* (2013.01); *E21B 33/076* (2013.01); *E21B 43/013* (2013.01); *E21C 50/00* (2013.01); *G01F 15/005* (2013.01); *G01F 15/14* (2013.01); *B63G 2008/005* (2013.01); *Y10T 137/7759* (2015.04); *Y10T 137/7761* (2015.04)

(58) Field of Classification Search
CPC ............................ E21B 33/076; E21B 43/16
USPC .......................................... 166/338, 344, 368
See application file for complete search history.

(56) References Cited

U.S. PATENT DOCUMENTS

| 4,315,523 | A | 2/1982 | Mahawili et al. |
| 4,391,150 | A | 7/1983 | Rey |
| 5,194,012 | A | 3/1993 | Cairns |
| 5,558,532 | A | 9/1996 | Hopper |
| 5,794,701 | A | 8/1998 | Cunningham et al. |
| 6,009,950 | A * | 1/2000 | Cunningham ........ E21B 33/038 166/344 |
| 6,354,146 | B1 | 3/2002 | Birchak et al. |
| 6,429,926 | B1 | 8/2002 | Williamson et al. |
| 6,460,621 | B2 * | 10/2002 | Fenton .................. E21B 33/035 166/347 |
| 6,481,504 | B1 * | 11/2002 | Gatherar ............... E21B 43/013 166/344 |
| 6,644,119 | B1 | 11/2003 | Sinha |

(Continued)

FOREIGN PATENT DOCUMENTS

WO 2008095113 8/2008
WO 2010065210 A1 6/2010

OTHER PUBLICATIONS

PCT International Search Report and Written Opinion; Application No. PCT/US2014/047898; Dated Nov. 14, 2014; 10 pages.

*Primary Examiner* — Matthew R Buck
(74) *Attorney, Agent, or Firm* — Fletcher Yoder P.C.

(57) ABSTRACT

A system including a fluid injection system configured to removably couple to a mineral extraction system, wherein the fluid injection system includes a fluid injection system controller, a flow meter system coupled to the fluid injection system controller, wherein the flow meter system is configured to measure a fluid flow of a fluid through the fluid injection system, an adjustable valve configured to control the fluid flow through the fluid injection system, and a non-return valve configured to block reverse flow of the fluid through the fluid injection system, wherein the fluid injection system controller, the flow meter system, the adjustable valve, and the non-return valve are coupled to a common housing.

22 Claims, 4 Drawing Sheets

(56) References Cited

U.S. PATENT DOCUMENTS

| | | | |
|---|---|---|---|
| 6,698,520 B2 * | 3/2004 | Fenton | E21B 33/035 166/347 |
| 6,823,941 B2 | 11/2004 | Donald | |
| 6,851,444 B1 | 2/2005 | Kohl et al. | |
| 7,234,524 B2 | 6/2007 | Shaw et al. | |
| 7,243,729 B2 | 7/2007 | Tyrrell et al. | |
| 7,380,835 B2 | 6/2008 | McCoy et al. | |
| 7,389,787 B2 | 6/2008 | Means et al. | |
| 8,066,076 B2 | 11/2011 | Donald et al. | |
| 8,151,890 B2 * | 4/2012 | Spencer | E21B 33/035 166/250.01 |
| 8,327,875 B2 * | 12/2012 | Grace | E21B 33/076 137/487.5 |
| 9,169,709 B2 * | 10/2015 | Vincent | E21B 43/01 |
| 2002/0011336 A1 | 1/2002 | Baskett et al. | |
| 2002/0089659 A1 | 7/2002 | Williamson et al. | |
| 2004/0226360 A1 | 11/2004 | Lotters | |
| 2008/0148841 A1 | 6/2008 | Sakai | |
| 2008/0163692 A1 | 7/2008 | Huang et al. | |
| 2008/0217022 A1 | 9/2008 | Deans | |
| 2008/0257032 A1 | 10/2008 | Zollo et al. | |
| 2009/0025936 A1 | 1/2009 | Donald et al. | |
| 2010/0043897 A1 * | 2/2010 | Grace | E21B 33/076 137/624.27 |
| 2010/0126600 A1 | 5/2010 | Watson | |
| 2011/0132103 A1 * | 6/2011 | Gottlieb | G01F 1/662 73/861.28 |
| 2012/0006556 A1 * | 1/2012 | McHugh | E21B 33/076 166/344 |
| 2012/0097400 A1 * | 4/2012 | Wium | F16K 47/06 166/368 |
| 2012/0174993 A1 | 7/2012 | McHugh | |
| 2012/0222492 A1 * | 9/2012 | Quin | G01F 1/662 73/861.28 |
| 2012/0312522 A1 | 12/2012 | Quin et al. | |

\* cited by examiner

FLUID INJECTION SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Wells are often used to access resources below the surface of the earth. For instance, oil, natural gas, and water are often extracted via a well. Some wells are used to inject materials below the surface of the earth, e.g., to sequester carbon dioxide, to store natural gas for later use, or to inject steam or other substances near an oil well to enhance recovery. Due to the value of these subsurface resources, wells are often drilled at great expense, and great care is typically taken to extend their useful life.

Chemical-injection management systems are often used to maintain a well and/or enhance well output. For example, chemical-injection management systems may inject chemicals to extend the life of a well or increase the rate at which resources are extracted from a well. Typically, these materials are injected into the well in a controlled manner over a period of time by the chemical-injection management system.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed toward a fluid injection system, such as a chemical injection metering valve (CIMV) system, which includes a flow meter system, an adjustable valve, and a non-return valve in a single module. The module is capable of insertion and removal from a sub-sea mineral extraction system with a remotely operated vehicle (ROV), which facilitates and reduces costs for repairing, inspecting, or replacing fluid injection systems. In operation, the fluid injection system enables measurement and control of fluids used in mineral extraction operations. For example, the fluid injection system may measure and control fluids used to increase resource extraction or to increase the operating life of a well.

Certain exemplary embodiments of the fluid injection system include a flow meter system that uses ultrasonic transducers to measure fluid flow rates. A controller uses the measurements from the flow meter system to control the flow rates (i.e., reduce or increase the flow rates) through the fluid injection system with an adjustable valve. In other embodiments, the fluid injection system may also include a pressure transducer system capable of measuring fluid pressure. The combination of the ultrasonic flow meter system and the pressure transducer system enables redundant measurement or backup measurement of fluid flow rates through the fluid injection system. In certain embodiments, the controller may use sensors that provide positional feedback to control the adjustable valve's position. For example, some embodiments may include a position sensor and/or a shaft rotation sensor that provides the controller positional information about the adjustable valve. The inclusion of the shaft rotation sensor and the position sensor enables redundant position information and/or backup position information to the controller for controlling the adjustable valve.

Figure 1:
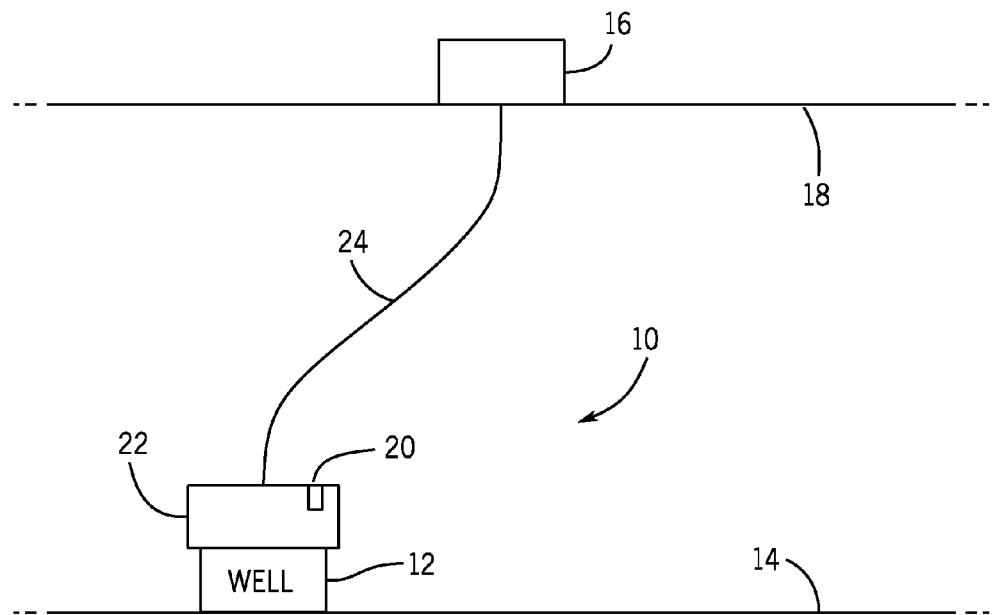
FIG. 1 is a block diagram of an embodiment of an exemplary resource extraction system.

FIG. 1 depicts an exemplary sub-sea resource extraction system 10. In particular, the sub-sea resource extraction system 10 may be used to extract oil, natural gas, and other related resources from a well 12, located on a sub-sea floor 14, to an extraction point 16 at a surface location 18. The extraction point 16 may be an on-shore processing facility, an off-shore rig, or any other extraction point. The sub-sea resource extraction system 10 may also be used to inject fluids, such as water, gas, chemicals, and so forth, into the well 12 through an underwater fluid injection system 20 (e.g., a chemical-injection system, such as a (CIMV system) on a Christmas tree 22. For example, the removable fluid injection system 20 may accurately inject corrosion-inhibiting materials, foam-inhibiting materials, wax-inhibiting materials, and/or antifreeze to extend the life of a well or increase the resource extraction rate from the well 12. These materials may be injected into the well 12 in a controlled manner over a period of time by the fluid injection system 20. The working fluids may be supplied to the sub-sea equipment using flexible jumper or umbilical lines 24. The flexible jumper or umbilical lines 24 may include reinforced polymer and small diameter steel supply lines, which are interstitially spaced into a larger reinforced polymer liner.

Figure 2:
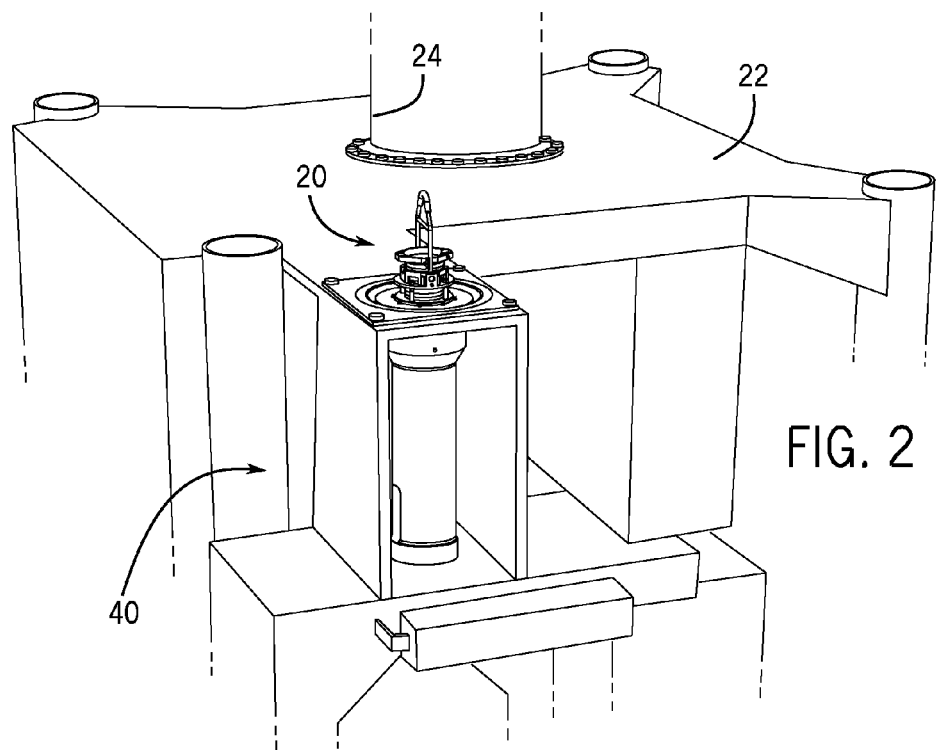
FIG. 2 is a partial perspective view of an embodiment of a Christmas tree with a fluid injection system.

FIG. 2 is a partial perspective view of an embodiment of the Christmas tree 22 with the fluid injection system 20. The tree 22 couples to the well 12 and may include a variety of valves, fittings, and controls for extracting resources out of the well 12. As illustrated, the Christmas tree 22 includes the receptacle 40 that removably receives (e.g., removably locks) the fluid injection system 20. The receptacle 40 enables fluid and electrical communication between the Christmas tree 22 and the fluid injection system 20. As will be discussed in detail below, when attached, the fluid injection system 20 measures and controls fluid flow into the well 12. For example, the fluid injection system 20 may inject water, gas, corrosion-inhibiting materials, foam-inhibiting materials, wax-inhibiting materials, and/or antifreeze to extend the life of a well or increase a mineral extraction rate out of the well. Again, these materials may be injected into the well in a controlled manner over a period of time by the fluid injection system 20.

Figure 3:
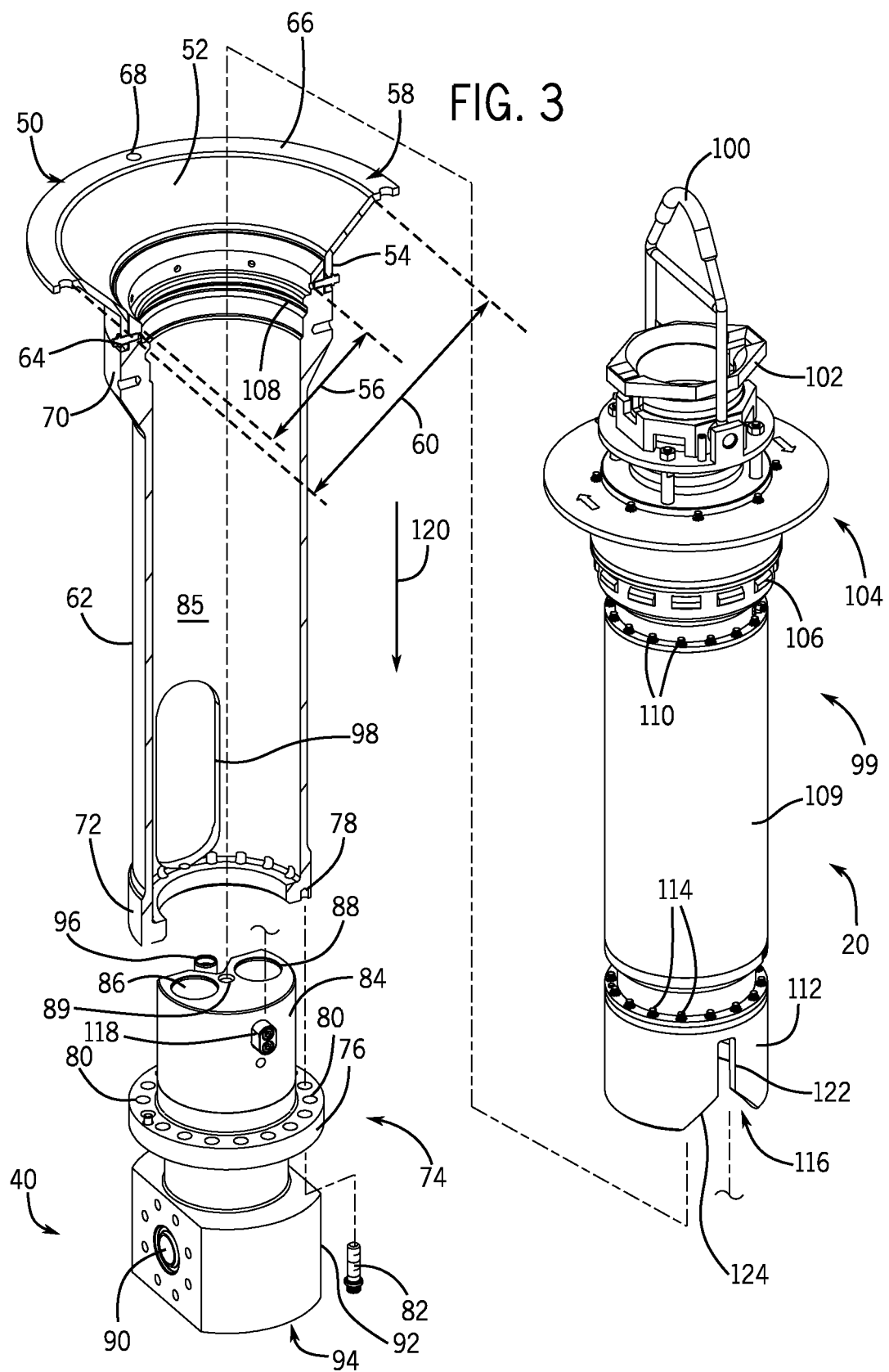
FIG. 3 is an exploded perspective view of an embodiment of a receptacle and a fluid injection system.

FIG. 3 is an exploded perspective view of an embodiment of the receptacle 40 capable of receiving the fluid injection system 20. The receptacle 40 includes a guide funnel 50 with a sloped annular surface 52 (e.g., a conical surface) that channels and aligns the fluid injection system 20 during connection to the Christmas tree 22. Specifically, the guide funnel 50 gradually changes in diameter from a first annular end 54 with a diameter 56 to a second annular end 58 with a diameter 60. The differences in diameters 56 and 60 define the angle or slope of the sloped surface 52. As illustrated, the guide funnel 50 couples to a receptacle housing 62 (e.g., an annular receptacle housing) with bolts 64. When coupled, the sloped surface 52, of the guide funnel 50, aligns and channels the fluid injection system 20 axially into the receptacle housing 62. In some embodiments, the guide funnel 50 may couple to the Christmas tree 22. For example, the second end 58 of the guide funnel 50 may include an annular flange 66 with apertures 68. The flange 66 may receive bolts through the apertures 68 that couple the guide funnel 50 to the Christmas tree 22.

Coupled to the guide funnel 50 is the receptacle housing 62. The receptacle housing 62 receives and secures the fluid injection system 20 between a first axial end 70 and a second axial end 72. As illustrated, the first end 70 couples to the guide funnel 50, while the second end 72 couples to a receptacle body 74. In order to couple to the receptacle body 74, the second end 72 of the receptacle housing 62 couples to an annular connection flange 76 on the receptacle body 74. More specifically, the second end 72 of the receptacle housing 62 includes an annular arrangement of apertures 78 that corresponds to an annular arrangement of apertures 80 on the connection flange 76. The apertures 78 and 80 enable bolts 82 to couple the receptacle housing 62 to the connection flange 76. When coupled, a first end 84 of the receptacle body 74 projects into cavity 85 of the receptacle housing 62 for connection to the fluid injection system 20. As illustrated, the first end 84 of the receptacle body 74 includes a fluid inlet 86 (e.g., chemical inlet), a fluid exit 88 (e.g., chemical outlet), and a guide pin receptacle 89. The fluid inlet 86 and the fluid exit 88 fluidly couple to corresponding flanged connections 90 and 92 on a second end 94 of the receptacle body 74. The flanged connections 90 and 92 fluidly couple the receptacle 40 to the Christmas tree 22, enabling the fluid injection system 20 to control fluid injection (e.g., chemical injection) from the extraction point 16 into the well 12. Furthermore, receptacle 40 may provide power and control signals to the fluid injection system 20 through the electrical connector 96. The electrical connector 96 in-turn receives power and control signals by coupling to the Christmas tree 22 with one or more cables through the aperture 98 in the receptacle housing 62.

In the illustrated embodiment, the fluid injection system 20 is a module 99 capable of insertion into and removal from the receptacle 40 with a remotely operated vehicle (ROV). The ability to remove and insert the fluid injection system 20 with an ROV facilitates replacement or repair without the use of a running tool and the associated costs. As illustrated, the fluid injection system 20 includes an over-pull handle 100 and a remotely operated vehicle (ROV) torque bucket 102 for coupling and removal of the fluid injection system 20. The ROV bucket 102 couples to a lockdown mechanism 104 that secures the fluid injection system 20 within the receptacle housing 62. More specifically, the lockdown mechanism 104 secures the fluid injection system 20 with radially movable dogs 106 that engage a groove 108 in the receptacle housing 62. The dogs 106 are capable of extending radially into and retracting radially away from the groove 108 enabling the fluid injection system 20 to be removed/coupled to the receptacle 40. In operation, an ROV activates or deactivates the lockdown mechanism 104 by engaging a nut within the ROV bucket 102.

Coupled to the lockdown mechanism 104 is a housing 109, such as a cylindrical or annular housing. As illustrated, the lockdown mechanism 104 couples to the housing 109 with bolts 110. The housing 109 may contain multiple components that measure and control fluid flow through the fluid injection system 20, and fluidly couple the fluid injection system 20 to the receptacle 40. To facilitate alignment and coupling, the fluid injection system 20 includes a guide skirt 112 (e.g., an annular guide skirt). The guide skirt 112 couples to the housing 109 with bolts 114. In the illustrated embodiment, the guide skirt 112 includes an axial slot 116 that aligns with and engages a guide key 118 on the receptacle body 74. More specifically, as the fluid injection system 20 moves in axial direction 120, the guide skirt 112 enables the fluid injection system 20 to rotate and align as the slot 116 engages the guide key 118, thereby circumferentially aligning the fluid and electrical connections (e.g., 86, 88, and 96). In some embodiments, the slot 116 may include an axial slot portion 122 and a converging slot portion 124. In operation, the converging slot portion 124 assists in circumferentially aligning the guide key 118 with the axial slot portion 122. Accordingly, as the housing 109 moves axially in direction 120 the slot 116 enables circumferential alignment of the housing 109 with the receptacle body 74. The circumferential alignment of the fluid injection system 20 with the receptacle 40 enables fluid and electrical coupling between the receptacle body 74 and the fluid injection system 20.

Figure 4:
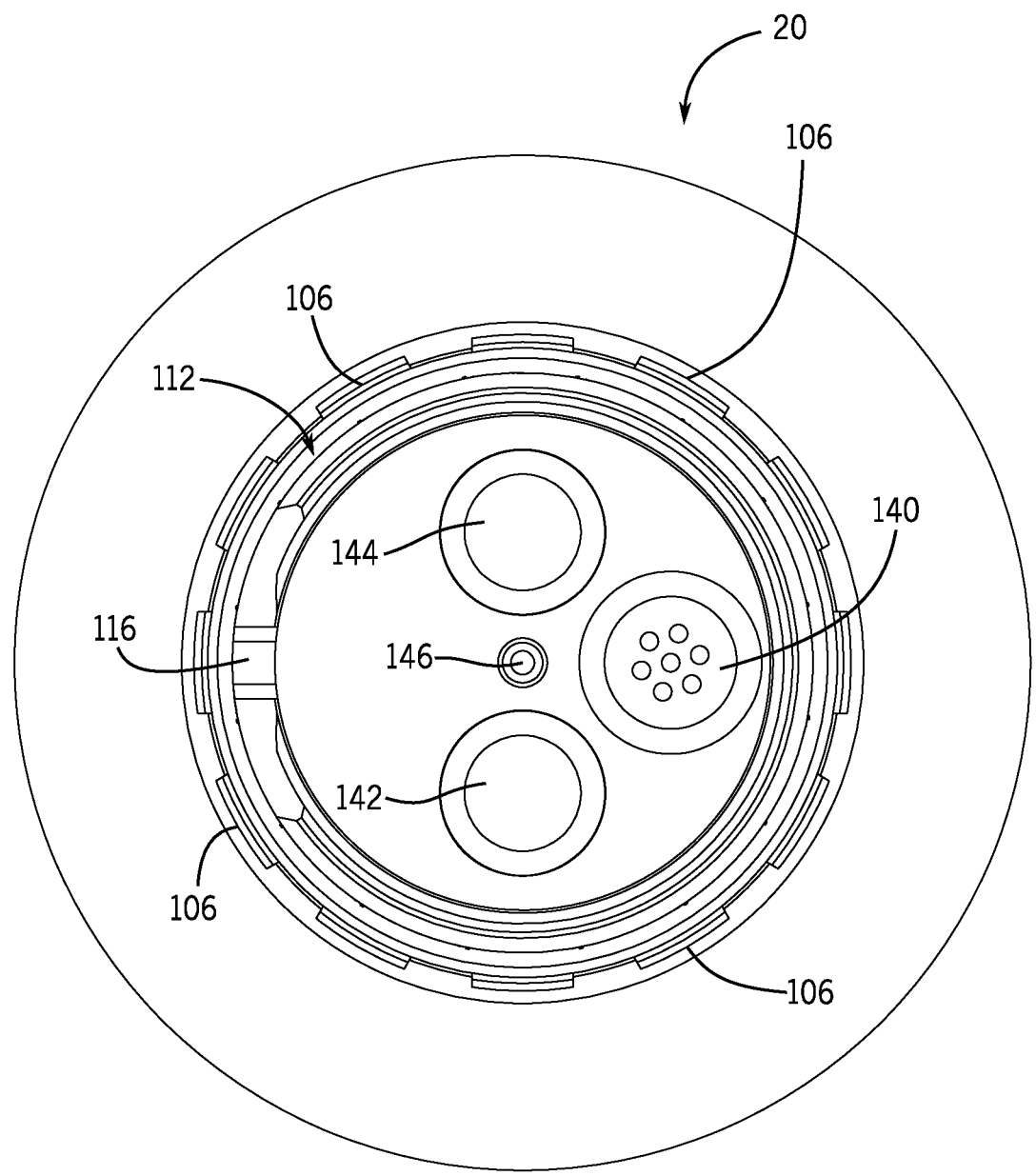
FIG. 4 is a bottom view of an embodiment of a fluid injection system.

FIG. 4 is a bottom view of the fluid injection system 20. As illustrated, the fluid injection system 20 includes an electrical connector 140, a fluid inlet coupler 142, a fluid outlet coupler 144, and an axial guide pin 146. As explained above, the engagement of the slot 116 with the guide key 118 circumferentially aligns (e.g., rotationally about the axis of) the fluid injection system 20 with the receptacle body 74. In some embodiments, the fluid injection system 20 may also include the guide pin 146 that couples to the guide pin receptacle 89 to facilitate radial or lateral alignment of electrical connector 140, fluid coupler 142, and fluid coupler 144. The radial alignment enables the electrical connector 96 to electrically couple to the electrical connector 140 removably in the axial direction, and the fluid couplers 142 and 144 to couple to the fluid inlet 86 and fluid outlet 88 removably in the axial direction. The removable connection between the electrical connector 96 and 140 enables the fluid injection system 20 to receive power and electrical signals to control and power components within the fluid injection system 20 to control and measure fluid flow. In some embodiments, the fluid injection system 20 may communicate with and receive instructions from an external mineral extraction system controller located on the Christmas tree 22 or at an extraction point 16. Moreover, the removable axial connection between fluid inlet coupler 142 and the fluid inlet 86 of the receptacle body 74; and the fluid outlet coupler 144 and the fluid outlet 88 of the receptacle body 74 enables fluid (e.g., one or more chemicals) to flow between the Christmas tree 22 and the fluid injection system 20.

Figure 5:
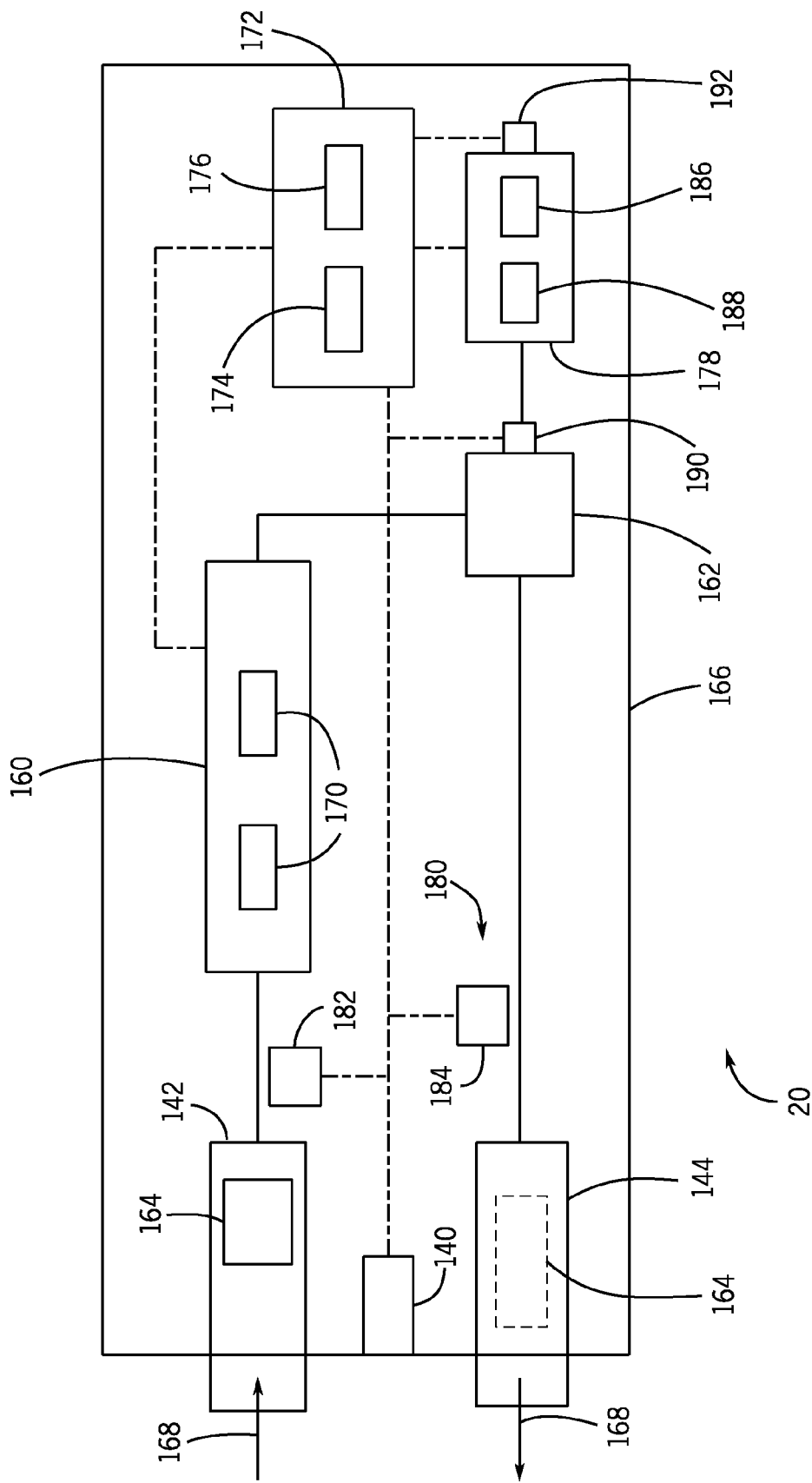
FIG. 5 is a schematic of an embodiment of a fluid injection system.

FIG. 5 is a block diagram of the fluid injection system 20 that may include a flow meter system 160, an adjustable valve 162, and a non-return valve 164 within a single removable module 166. As explained above, the fluid injection system 20 is capable of insertion and removal with an ROV, thereby reducing costs and the difficulty associated with using a running tool. In operation, the fluid injection system 20 measures and controls the flow of a fluid 168 (e.g., water, gas, chemicals) into the sub-sea resource extraction system 10. These fluids may assist in the extraction of the mineral resource or increase the operating life of the well 12. After fluidly coupling the module 166 to a Christmas tree 22 or other mineral extraction equipment, the fluid 168 enters the fluid injection system 20 through the fluid inlet coupler 142. As illustrated, the fluid inlet coupler 142 may include a non-return valve 164 (e.g., a one-way valve, a check valve, etc.) that enables fluid flow into the fluid injection system 20, but blocks the reverse flow of fluid out of the fluid injection system 20.

After passing through the fluid inlet coupler 142 (e.g., a male plug, snap fit connector, etc.), the fluid 168 enters the flow meter system 160. In the flow meter system 160 (e.g., a primary flow meter system), one or more ultrasonic transducers 170 measure the fluid flow into the fluid injection system 20. The ultrasonic transducers 170 measure flow speeds by rapidly sending and receiving ultrasonic waves that travel through the fluid 168. A controller 172 (i.e., a fluid injection system controller) couples to the flow meter system 160 and collects the transmission and reception times by the ultrasonic transducers 170. The controller 172 then calculates how the ultrasonic waves change through the fluid 168, enabling the controller 172 to calculate changes in the fluid flow. For example, the controller 172 may include a processor 174 and memory 176, which the controller 172 uses to determine a volumetric flow rate, a mass flow rate, a volume, or a mass based on a signal from the flow meter system 160. The controller 172 may also regulate or control one or more of these parameters based on the signal from the flow meter 160 by signaling the valve actuator 178 to adjust the adjustable valve 162. To this end, the controller 172 may include software and/or circuitry configured to execute a control routine. In some embodiments, the control routine and/or data based on a signal from the flow meter 160 may be stored in memory 176 or another computer-readable medium. In some embodiments, the controller 172 (i.e., a fluid injection system controller) may communicate with and receive instructions from a mineral extraction system controller located on the Christmas tree or at an extraction point 16.

In some embodiments, the fluid injection system 20 may also include a pressure transducer system 180 (e.g., a secondary flow meter system) that enables redundant or backup flow rate measurements. The pressure transducer system 180 includes a first pressure transducer 182 and a secondary pressure transducer 184 to measure fluid pressures at different locations in the fluid injection system 20. As illustrated, the first pressure transducer 182 enables pressure measurements of the fluid 168 before the fluid passes through the adjustable valve 162, while the second pressure transducer 184 measures pressure after the fluid 168 passes through the adjustable valve 162. The controller 172 compares the pressures sensed by the pressure transducers 182 and 184 using known values about the fluid and valve position to calculate the fluid flow rate through the fluid injection system 20. Depending on the embodiment, the fluid injection system 20 may use the flow rate system 160 and the pressure transducer system 180 simultaneously or separately to measure the flow rate of fluid 168.

As explained above, the controller 172 regulates or controls fluid flow based signals from the flow meter system 160 and/or the pressure transducer system 180. In operation, the controller 172 uses the signals to exercise feedback control over fluid flow through the adjustable valve 162 with the valve actuator 178. For example, the controller 172 may transmit a control signal 142 to the valve actuator 178. The content of the control signal 142 may be determined by, or based on, a comparison between a flow parameter (e.g., a volumetric flow rate, a mass flow rate, a volume, or a mass) measured by the flow meter system 160 or the pressure transducer system 180 and a desired flow parameter value. For instance, if the controller 172 determines that the flow rate through the fluid injection system 20 is less than a desired flow rate, the controller 172 may signal the valve actuator 178 to open adjustable valve 162 some distance. In response, a motor 186 may drive a gearbox 188, and the gearbox 188 may transmit rotational movement from the motor 186 into linear or rotational movement of the adjustable valve 162. As a result, in some embodiments, the flow rate through the adjustable valve 162 may increase as the adjustable valve 162 opens. Alternatively, if the controller 172 determines that the flow rate (or other flow parameter) through the fluid injection system 20 is greater than a desired flow rate (or other flow parameter), the controller 172 may signal the valve actuator 178 to close the adjustable valve 162 some distance, thereby decreasing the flow rate. In other words, the controller 172 may signal the valve actuator 178 to open or close the adjustable valve 162 some distance based on a flow parameter sensed by the flow meter 160 or the pressure transducer system 180.

The controller 172 may monitor and control the position of the adjustable valve 162 with signals received from a position sensor 190 and/or a shaft rotation sensor 192. As illustrated, the position sensor 190 couples to the adjustable valve 162 and the shaft rotation sensor 192 couples to the actuator 178. In this arrangement, the position sensor 190 provides positional feedback to the controller 172 based on actual movement of the adjustable valve 162. In contrast, the shaft rotation sensor 192 provides indirect positional feedback of the adjustable valve 162 by sensing positional change of the actuator 178. In other words, the shaft rotation sensor 192 provides signals to the controller 172 indicating movement of the actuator 178, which the controller 172 then uses to determine movement of the adjustable valve 162. The combination of the position sensor 190 and the shaft rotation sensor 192 provides the controller 172 redundant positional information or backup positional information of the adjustable valve 162, enabling the controller 172 to control fluid flow through fluid injection system 20. After passing through the adjustable valve 162, the fluid 168 exits the fluid injection system 20 through a fluid outlet coupler 144 (e.g., a male plug, snap fit connector, etc.) for use by the sub-sea resource extraction system 10. In some embodiments, the fluid outlet coupler 144 includes a non-return valve 164 (e.g., a one-way valve, a check valve, etc.) that blocks the reverse flow of the fluid 168 into the fluid injection system 20.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
a fluid injection system configured to removably couple to a mineral extraction system, wherein the fluid injection system comprises:

a housing having a fluid inlet, a fluid outlet, and a flow path between the fluid inlet and the fluid outlet;

a fluid injection system controller disposed in the housing;

a flow meter system disposed in the housing and coupled to the fluid injection system controller, wherein the flow meter system is configured to measure a fluid flow of an injection fluid along the flow path through the fluid injection system;

an adjustable valve disposed in the housing, wherein the adjustable valve is configured to control the fluid flow along the flow path through the fluid injection system; and a non-return valve disposed in the housing, wherein the non-return valve is configured to allow forward fluid flow of the injection fluid and block reverse fluid flow along the flow path through the fluid injection system.

2. The system of claim 1, wherein the fluid injection system comprises a first end configured to couple to a remotely operated vehicle (ROV) and a second end configured to couple to the mineral extraction system, and the second end comprises the fluid inlet and the fluid outlet.

3. The system of claim 1, wherein the housing has an electrical connector, wherein the fluid injection system is configured to selectively couple the fluid inlet with a mating fluid outlet, the fluid outlet with a mating fluid inlet, and the electrical connector with a mating electrical connector.

4. The system of claim 1, wherein the fluid inlet comprises a first coupler and the fluid outlet comprises a second coupler, wherein the first coupler and the second coupler are configured to removably couple the fluid injection system to the mineral extraction system.

5. The system of claim 4, wherein the non-return valve rests within the first coupler or the second coupler.

6. The system of claim 3, wherein the fluid injection system comprises a lockdown mechanism configured to selectively lock the housing to the mineral extraction system, and the lockdown mechanism comprises one or more radial locks.

7. The system of claim 1, wherein the fluid injection system comprises a first pressure transducer disposed in the housing, and the first pressure transducer is configured to measure a first fluid pressure at a first location along the flow path in the fluid injection system.

8. The system of claim 7, wherein the fluid injection system comprises a second pressure transducer disposed in the housing, and the second pressure transducer is configured to measure a second fluid pressure at a second location along the flow path in the fluid injection system.

9. The system of claim 1, wherein the fluid injection system comprises an actuator configured to drive the adjustable valve between open and closed positions.

10. The system of claim 1, wherein the fluid injection system comprises a position sensor coupled to the adjustable valve.

11. The system of claim 1, wherein the fluid injection system comprises a shaft rotation sensor coupled to an actuator, and the actuator is coupled to the adjustable valve.

12. The system of claim 1, wherein the fluid injection system comprises a chemical injection system, and the injection fluid comprises one or more chemicals.

13. The system of claim 1, wherein the fluid injection system comprises a water injection system, and the injection fluid comprises water.

14. A system, comprising:
a fluid injection system configured to removably couple to a mineral extraction system, wherein the fluid injection system comprises:

a housing having a fluid inlet, a fluid outlet, a flow path between the fluid inlet and the fluid outlet, and an electrical connector;

a controller disposed in the housing and coupled to the electrical connector;

an ultrasonic flow meter system disposed in the housing and coupled to the controller, wherein the ultrasonic flow meter system is configured to measure a fluid flow of a fluid along the flow path; and a pressure measurement system disposed in the housing and coupled to the controller, wherein the pressure measurement system is configured to measure a fluid pressure along the flow path.

15. The system of claim 14, wherein the fluid injection system comprises an adjustable valve disposed in the housing along the flow path and configured to control the fluid flow in response to a measurement of the fluid flow by the ultrasonic flow meter system or the pressure measurement system.

16. The system of claim 14, wherein the fluid injection system comprises a non-return valve disposed in the housing along the flow path, and the non-return valve is configured to allow forward fluid flow of the fluid and block reverse flow of the fluid along the flow path through the fluid injection system.

17. The system of claim 14, wherein the housing comprises a first end configured to couple to a remotely operated vehicle (ROV) and a second end configured to couple to the mineral extraction system, and wherein the second end comprises the fluid inlet, the fluid outlet, and the electrical connector.

18. A system, comprising:
an underwater apparatus configured to removably couple to an underwater mineral extraction system, wherein the underwater apparatus comprises:

a housing having a fluid inlet, a fluid outlet, a flow path between the fluid inlet and the fluid outlet, and a first alignment guide, wherein the first alignment guide is configured to guide a connection between the first inlet and a first mating outlet and the first outlet and a first mating inlet of the underwater mineral extraction system;

an ultrasonic flow meter system disposed along the flow path within the housing, wherein the ultrasonic flow meter system is configured to measure a fluid flow of a fluid along the flow path through the underwater apparatus; and a non-return valve configured to allow forward fluid flow of the fluid and block reverse flow of the fluid along the flow path through the underwater apparatus.

19. The system of claim 18, wherein the non-return valve is disposed in a first coupler of the fluid inlet or in a second coupler of the fluid outlet.

20. The system of claim 18, wherein the underwater apparatus comprises an adjustable valve disposed in the housing along the flow path.

21. The system of claim 18, wherein the ultrasonic flow meter system comprises a first ultrasonic transducer and a second ultrasonic transducer configured to measure a fluid flow rate along the flow path through the underwater apparatus.

22. The system of claim 20, wherein the underwater apparatus comprises a controller disposed in the housing and configured to control the adjustable valve in response to the ultrasonic flow meter system.

* * * * *